INVENTOR.
ALBERT G. BODINE

Feb. 20, 1973  A. G. BODINE  3,717,567
USE OF SONIC RESONANT ENERGY IN ELECTRICAL MACHINING
Original Filed May 29, 1967  3 Sheets-Sheet 2
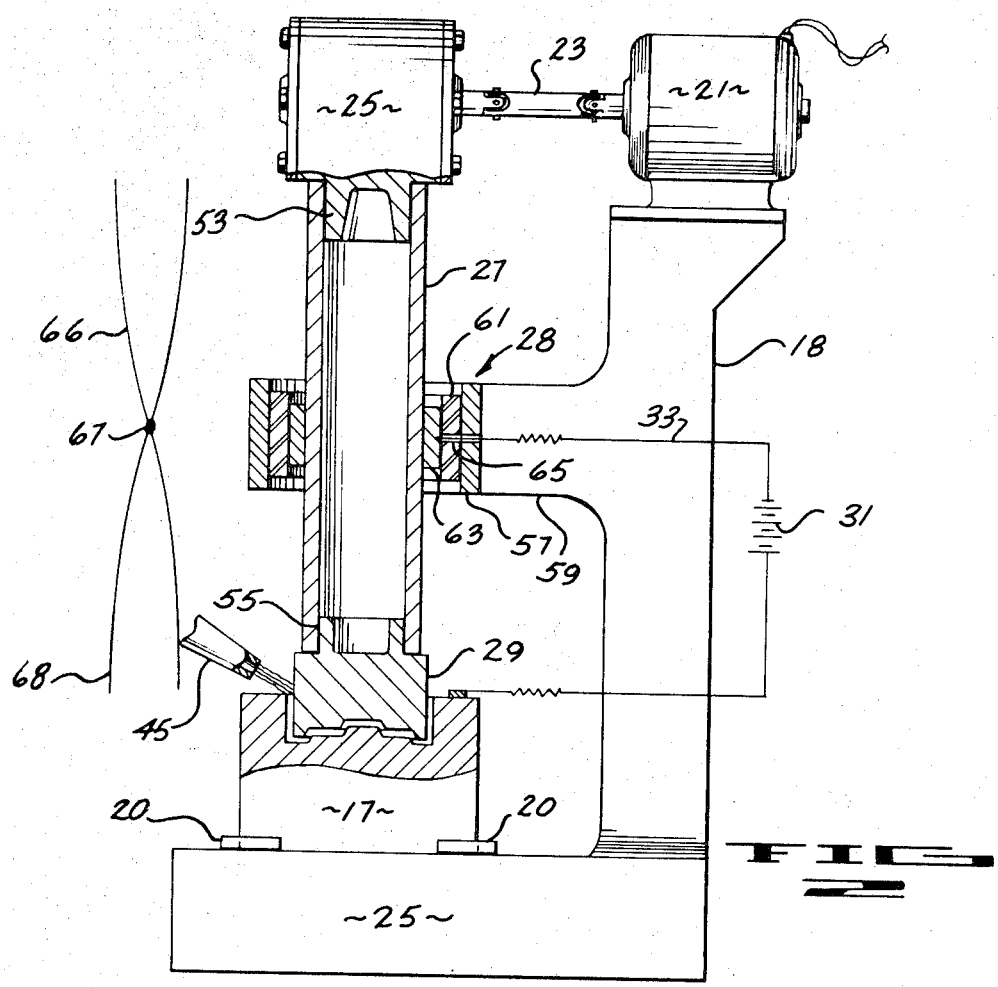
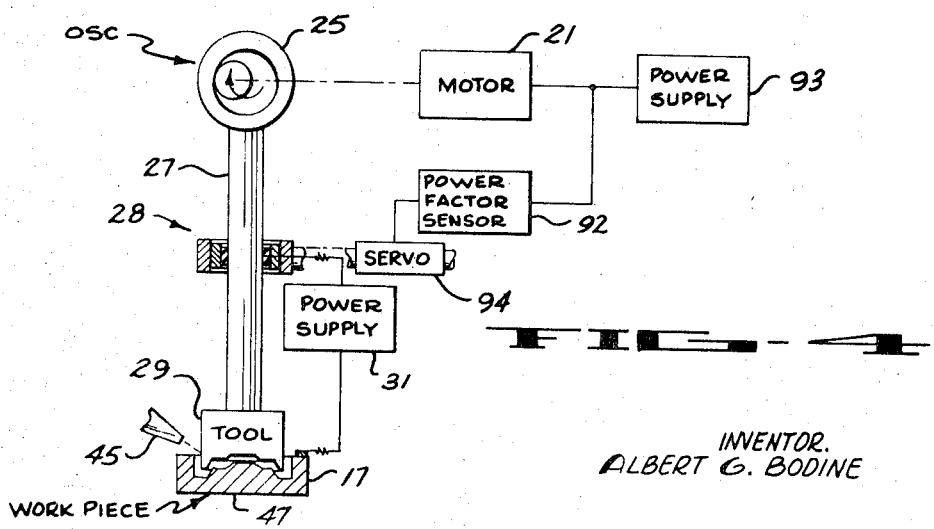
INVENTOR.
ALBERT G. BODINE

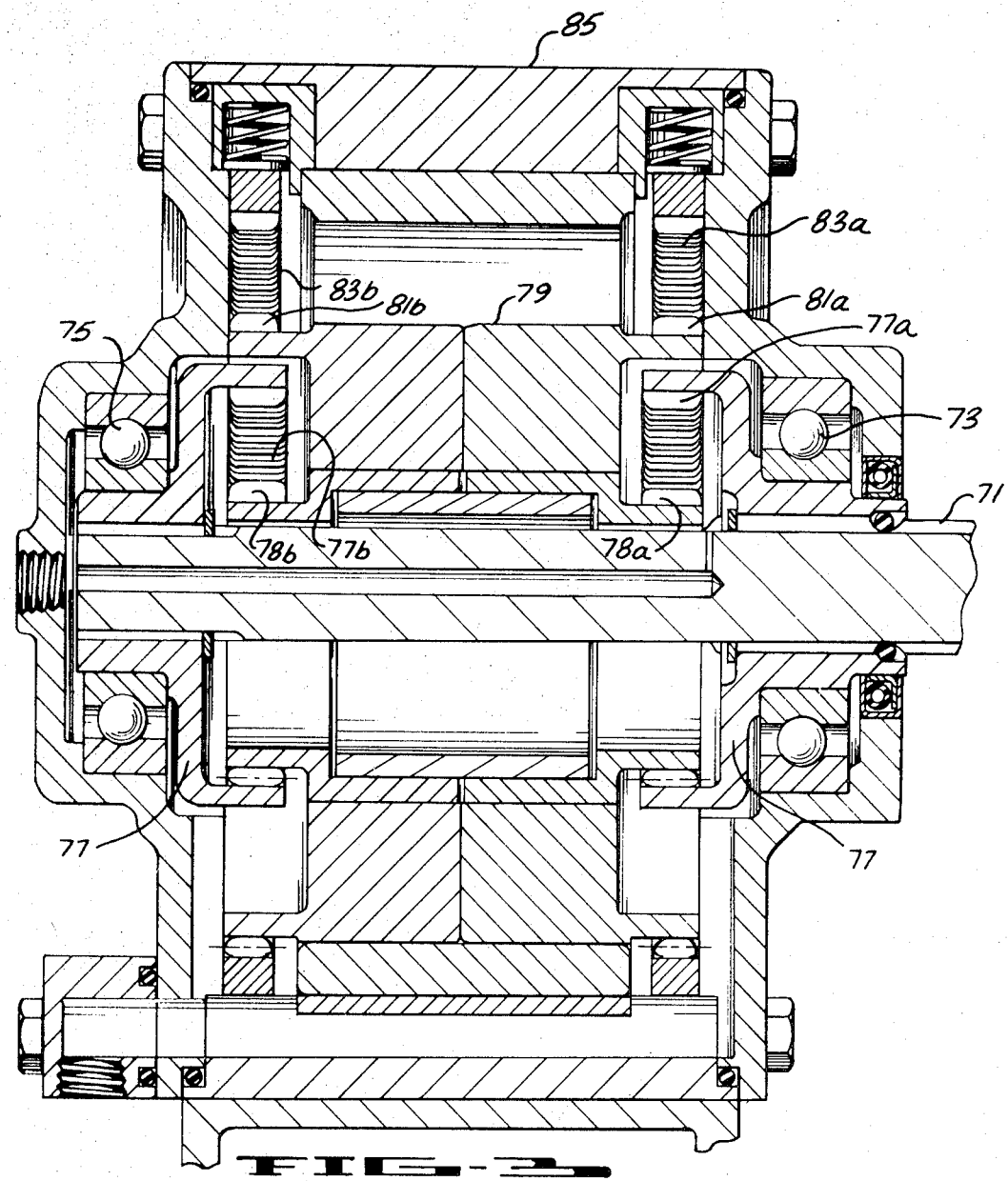

United States Patent Office 3,717,567
Patented Feb. 20, 1973

3,717,567
USE OF SONIC RESONANT ENERGY IN
ELECTRICAL MACHINING
Albert G. Bodine, 7877 Woodley Ave.,
Van Nuys, Calif. 91406
Original application May 29, 1967, Ser. No. 642,085, now Patent No. 3,567,604. Divided and this application Oct. 26, 1970, Ser. No. 83,908
Int. Cl. B01k 3/00; B23p 1/02
U.S. Cl. 204—222   7 Claims

ABSTRACT OF THE DISCLOSURE

A device for electrical machining which consists of applying sonic energy to the work tool element. The work tool is resonantly vibrated so that a wave pattern is transmitted to the tip thereof adjacent the workpiece and is transmitted through the working fluid to the workpiece.

---

This application is a divisional of application Ser. No. 642,085, filed May 29, 1967, now U.S. Pat. No. 3,567,604.

The herein invention is applicable broadly to the area of electrical machining. Generally, this comprises the utilization of a tool having formed on the face thereof a configuration which is desired to be formed on the surface of the workpiece. The tool tip is then brought into close proximity with the workpiece at the point where the forming is desired. Usually, the tool and workpiece are connected in an electric circuit such that the tool is a cathode and the workpiece an anode. The electrical current is caused to flow between the tool and the workpiece so as to have electrical or electrochemical effects to facilitate the etching, or cuting of the surface of the workpiece. Examples of electrical machining include electrolytic machining, electrodischarge machining, and electrochemical machining. In most all instances a fluid is caused to flow in a small gap between the base of the tip of the tool and the surface of the workpiece. In electrochemical machining the material is an electrolyte which is simply a water solution that carries the current. Most salts, mineral acids and various caustics in water solutions will assist in carrying this electrical current. The electrical energy starts a chemical reaction in the electrolyte solution which results in the formation of gas at the tool and dissolvement of metal in the workpiece. The gas boils off into the atmosphere and the dissolved metal is carried in the solution.

In electrodischarge machining, the fluid is generally called the dielectric and serves to carry the metal removed out of the gap between the tool and workpiece as well as cooling the tool and workpiece. Generally these dielectrics are hydrocarbons which supply carbon and hydrogen to the discharge and tend to resist the expansion of gas bubbles. Other fluids, such as air and water, have been used but are less desirable than the hydrocarbons. The advantages of electrical machining are now well known in the art and generally relate to the formation of a three-dimensional mirror image of the work tool tip upon the workpiece. This is accomplished without excessive working or changing the metallic structure of the workpiece. Thus, electrical machining combines several conventional metal working steps and as can be seen, the surface of the workpiece is eroded in accord with the pattern on the tip of the tool according to the chemical action in the electrochemical procedure or according to the effect of the electric current in the electrodischarge method.

The herein invention utilizing sonic energy, as will be explained, further increases the effect of the electrical machining methods. In other words, a given electrical machining method incorporating the apparatus and method of this invention utilizing sonic energy will operate with increased efficiency providing improved results.

The concept of vibrating the machining tool in an electrochemical process has been disclosed as seen in U.S. Pat. No. 3,271,283 of Sept. 6, 1966. Additionally, there have been other disclosures relating to the vibration of the tool utilized in electrical machining process. However, as will be shown, the vibration previously contemplated as seen in the referred to patent differs significantly from orbital resonant energy and will not and cannot achieve the desired end results obtained by the present invention.

As disclosed in the aforementioned patent, the electrode tool is continuously vibrated or oscillated towards and away from the workpiece surface. The electrolyte is fed between the tool and workpiece in synchronism with the oscillations of the tool. The oscillations or vibrations are caused by a transducer which is described as being either a piezoelectric crystal, electromagnet or a mechanical or hydraulic device. Specifically shown in the patent is a rod member connected at one end to a rotating cam. The opposite end is affixed to the tool used in the electrochemical shaping. The rod and tool move vertically up and down in accord with the rotation of the cam. Obviously the frequency of the vibrations is affected by the speed at which the cam is caused to rotate. As indicated, the patented vibratory method exerts considerable pressure on the electrolyte and serves to prevent boiling thereof. Additionally, hydrogen gas bubbles are reduced due to the pressure resulting from the ram-like movement of the tool. However, it is important to note that there is no attempt to transfer the vibrations from the tool to the workpiece surface. The fluid, since it is retained in the cavity during the compression of the tool, serves as a cushion to absorb the impact therefrom. Additionally, there is no attempt to establish resonant vibration since the effect thereof has not previously been appreciated for utilization in electrical machining.

The device of this invention utilizes, as previously indicated, resonant vibration in the entire work tool. This is accomplished by connecting one end of an elastic column to an orbiting-mass oscillator, for example, while affixing the other end thereof to the work tool. Thus, the work tool together with the shaft form a mass in a system in which there is established resonant frequency vibration through the utilization of the orbiting-mass oscillator. The result is elastic vibration which at resonance will maximize the effective amount of energy that can be transmitted from the tool to the surrounding environment. In the case of the instant invention, it means that a maximum amount of energy can be transmitted from the tip or face of the tool to the electrolyte or working fluid which serves as a transmission medium for the energy to the workpiece surface itself. This maximized vibratory energy causes molecule excitation in the workpiece surface area enabling a more effective machining thereof. Additionally, and of great importance, is the fact that with the resonant vibration obtained, the electrolyte achieves a cavitation which effectively mobilizes and disperses any bubbles that have been formed during the process.

Additionally, as will be particularly pointed out, the orbital resonant system utilized automatically adjusts to changes of impedance in the system. The electrolyte serves as an impedance load on the oscillating tool so that when there are changes in the viscosity of the electrolyte fluid there is a corresponding change in the resistive impedance thereof. Additionally, when bubbles are created in the electrolyte there is also a change in the impedance. The orbital resonant system automatically adjusts for these changes in the electrolyte material so as to always maximize the resonant effect of the tool. This adjustment and sensing of change of impedance can be used to control the movement of the tool toward the workpiece during the operation.

It is believed that the invention will become more apparent from the following detailed description taken in conjunction with the accompanying drawings in which:

FIG. 2 is a partially sectioned side view of the device of the invention showing the details of the electrical connection to the elongated column connecting the oscillator and tool;

FIG. 3 is a detailed sectional view of the orbiting-mass oscillator taken along lines 3—3 of FIG. 1; and FIG. 4 is a schematic diagram disclosing the circuitry for effectively operating the device of the invention.

Figure 1:
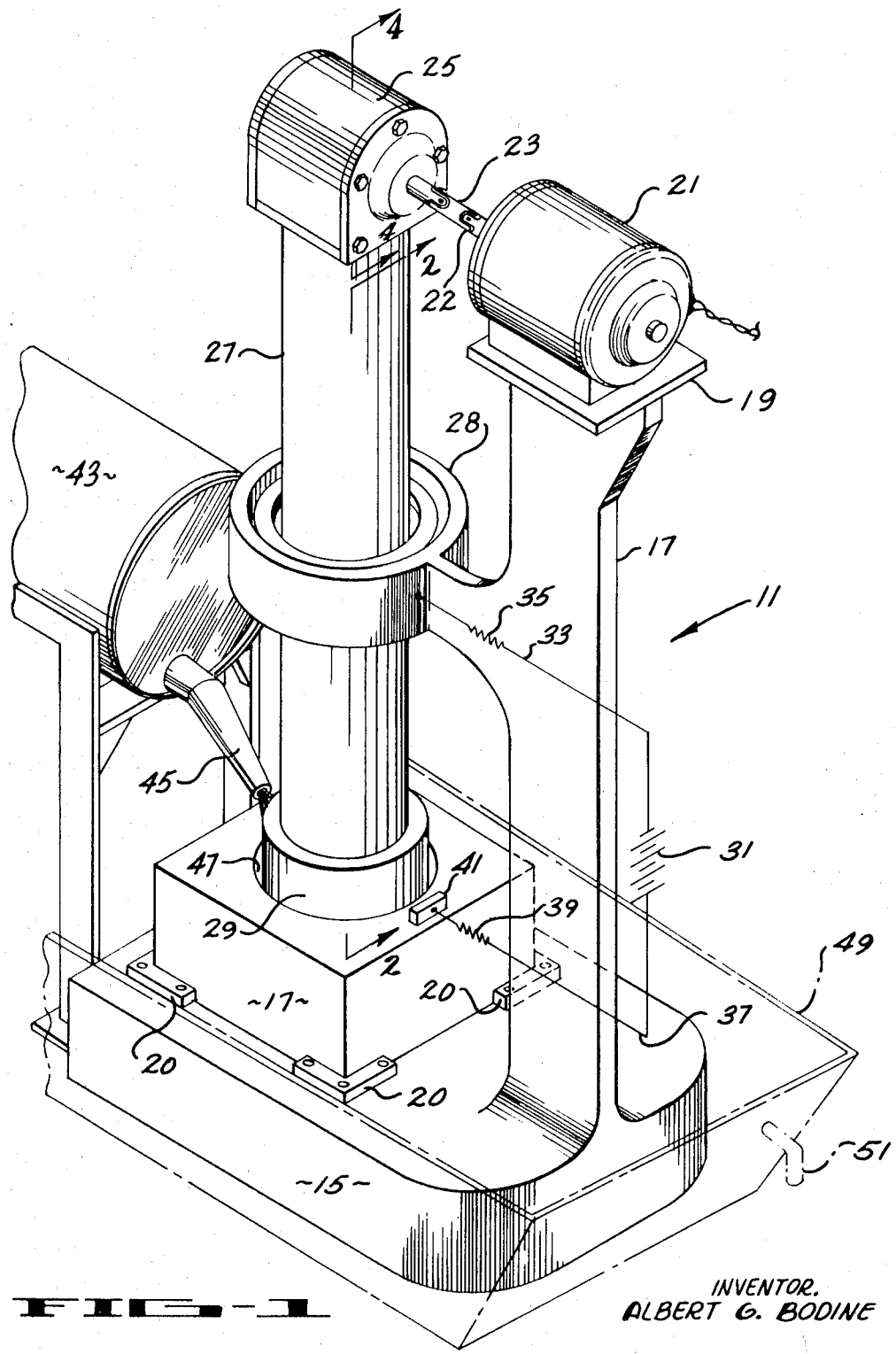
FIG. 1 is a perspective view of the device of the invention.

In order to facilitate the comprehension of the technique of the invention, it is helpful to make an analogy between an electrical resonant circuit and a mechanical resonant circuit. This type of analogy is well known to those skilled in the art and is described, for example, in Chapter 2 of "Sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance such as friction $R_m$ is equated with electrical resistance R, mechanical impedance $Z_m$ is equated with electrical impedance $Z_e$.

Thus it can be shown that if a member is elastically vibrated by a sinusoidal force $F_o \sin \omega t$, being equal to $2\pi$ times the frequency of vibration, that $$Z_m = R_m + J\left(\omega M - \frac{1}{\omega C_m}\right) = \frac{F_o \sin \omega t}{u} \quad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration $u$ is at a maximum and energy is most efficiently delivered to the object being vibrated. It is such a high-efficiency resonant condition in the elastic system being driven that is utilized in the method of this invention to achieve the desired end results.

Just as the sharpness of resonance of an electrical circuit is defined as the "Q" thereof, and is indicative of the ratio of energy stored to the energy used in each cycle, so also the "Q" of the mechanical resonant circuit has the same significance and is equal to the ratio between $\omega M$ and $R_m$. Thus, high efficiency and considerable cyclic motion can be achieved by designing the mechanical resonant circuit for high "Q" as, for example, by utilizing a metallic bar member having high elasticity and mass.

In considering the significance of the parameters described in connection with Equation 1, it should be kept in mind that the *total* effective resistance, mass and compliance in the acoustically vibrating circuit are represented in the equation and that these parameters may be distributed throughout the system or circuit rather than being lumped in any one component or portion thereof.

It is particularly to be noted that an orbiting-mass oscillator is utilized in the implementation of the invention that automatically adjusts its output frequency to maintain resonance with changes in the characteristics of the load. Thus, in the face of changes in the effective mass and compliance presented by the load, the system automatically is maintained in optimum resonant operation by virtue of the "lock-in" characteristics of applicant's unique orbiting-mass oscillator. The orbiting-mass oscillator automatically changes not only its frequency but its phase angle and therefore its power factor with changes in the resistive impedance load to assure optimum efficiency of operation at all times. Thus as the impedance characteristics of the system gradually change as the workpiece is machined, the oscillator automatically accommodates to such changes to maintain high-level resonant operation and optimum power factor at all times. The sonic action provided by virtue of applicant's orbiting-mass oscillators thus affords specific advantages to the implementation of the method of this invention.

In carrying out the method of this invention, sonic energy is generated by means of an orbiting-mass oscillator coupled to an elastic vibration system. The oscillator is operated at a speed such as to cause resonant vibration of such system which may comprise an elastic bar member. The elastic bar member is coupled to a conventional tool used for electrical machining. The tool is then moved adjacent to the workpiece and an electrolyte or conductive fluid is caused to flow therebetween. The sonic energy is transferred through the fluid to the workpiece where excitation of the molecules causes improved machining.

Referring now to FIG. 1, there is shown the device of the invention 11 which comprises a stand 13 having a base portion 15 for holding both a workpiece 17 by brackets 20 and adjacent apparatus. Extending vertically upward from the base portion 15 is a support arm 18 which terminates in a platform 19. Disposed on platform 19 is a motor 21 which is connected by means of a universal joint 22 and shaft 23 to an oscillator 25. Extending downwardly from oscillator 25 is an elastic metal tube 27. The base of the elastic tube or column 27 is affixed to a tool 29 used to machine the workpiece 17. Extending from support arm 18 and surrounding the tube 27 is a centering ring 28 which serves to maintain the placement of the elastic tube 27 in a constant horizontal position relative to the workpiece as well as isolate the support structure from vibration.

Schematically there is shown the electric circuit for effecting the machining comprised of a battery 31 with its negative output line 33 connected to tube 27. A resistor 35 is placed in the circuit to limit the current. The positive side 37 of the battery 31 is connected to the workpiece and has a current limiting resistor 39 in its circuit. Contact is made with the workpiece 17 by means of a metal electrode 41 which can be attached to the workpiece to provide good electrical contact such as by soldering. Alternatively, electrical connection can be made through the base portion 15. The electrolyte used is supplied from pressurized tank 43 and is fed by means of a jet nozzle 45 in the space 47 between the tool and the workpiece. The jet nozzle assures a high flow rate of electrolyte. There is shown by way of example a trough 49 which surrounds the base portion of the device and serves to collect the overflow of electrolyte utilized. An outlet 51 carries the electrolyte from the trough.

Turning now to FIG. 2, there is shown the detail of the support ring 28 and the elastic column 27. It can be seen the tube 27 is of hollow construction so that it can be press-fit to the oscillator 25 at a downwardly extending portion 53. The tool 29 likewise has an upwardly extending neck portion 55 that is press-fit within the tube or column 27 at its bottom extremity. This arrangement provides for easy assembly and disassembly of the device of the invention. A hollow cylindrical column is shown as a preferred example because, as explained, it facilitates easy attachment to both the oscillator and tool. However, the column 27 can be a solid rod of steel or like elastic material.

The ring 28 surrounding the elastic column 27 at approximately its midpoint serves two primary functions: The first is to maintain in a steady position the column relative to the workpiece 17, and secondly to acoustically isolate from vibration the support arm 18 and remaining structure attached to the arm. The ring 28 is actually comprised of three concentric members. The first is an outer ring 57 of metal such as steel, which is formed integrally with the support arm 18 attached to an extension 59 thereof. Concentrically within the outer ring 57 is a second ring 61 of a viscoelastic material such as rubber, which will serve to isolate the outer ring 27 and remaining structure from the vibrations of the column 27. The ring 61 obviously can be of any suitable shock-absorbing material. Finally, concentrically within ring 61 is a third ring 63, of metal, which is tight-fitted to the column 27. As can be seen, the electrical lead 33 passes through aperture 65 in the two outer rings 57 and 61 and is affixed to the innermost ring 63 which serves as a conductive member to carry the current to the column 27 to make it cathodic together with the tool 29.

As shown adjacent to FIG. 2 a standing wave pattern 66 is established in the tube 27 and tool 29. The wave has a nodal point 67 at approximately the midpoint of the elastic column 27. Thus at this midpoint where the ring 28 is affixed there is minimum vibration which further enables the isolation of the support structure from the vibrating tube. It should be apparent that such isolation is conducive to the maximum transfer thereof to the tool 29 without dissipation of that force to surrounding structure. Additionally, the system is arranged to provide an antinode 68 at the face of the tool to maximize the resonance activity where it is to be transferred to the workpiece.

Referring now to FIG. 3, there is shown an orbiting-mass oscillator 25, which can be utilized in implementation of the technique of the invention as illustrated. Oscillator drive shaft 71, which is rotatably driven in roller bearings 73 and 75, is coupled to paired oscillator drive members 77, which have gear rings 77a and 77b thereon. Gear rings 77a and 77b engage spur gears 78a and 78b, respectively, gears 78a and 78b being attached to rotor member 79. Rotor 79 further has spur gears 81a and 81b attached thereto which engage gear rings 83a and 83b, respectively, gear rings 83a and 83b being attached to the inner walls of oscillator housing 35. Thus when drive shaft 71 is rotatably driven by means of its associated motor 21, rotor member 79 is driven around the race formed in the inner walls of housing 85 in an orbiting path and sets up gyratory vibrations in the casing 85. Casing 85 then delivers periodic forces to resonator 27 by means of connection 53.

Turning now to FIG. 4, there is shown schematic diagram of the apparatus previously disclosed together with a unique servo system for sensing the required gap betwen the tool and workpiece as forming transpires. One of the important advantages of the instant invention is the ability of the orbital resonant system to adjust to changes of impedance. Such changes of impedance will include reactive impedance which results in frequency and phase shift of the resonant system. The orbiting-mass oscillator 25 automatically accommodates for these frequency and phase shifts as the work load changes its impedance loading of the tool. For instance, during the interval when the gap 47 between the tool and the workpiece is in the form of only liquid with practically no air bubbles; a fairly rigid coupling between the workpiece and the tool is thus formed. This causes the tool 29 to be conscious of the mass reactance of the workpiece 17 with the resultant shift of frequency of the main tool. The orbiting oscillator 25 automatically and instantaneously adjusts for the instantaneous changes in the environmental reactance presented at the point of the tool tip. In other words, if the tool tip sees a highly mass-reactive load caused by the workpiece, then the orbital resonant system will adjust for this reactance. Further, there are changes in resistive impedance, such as changes in the viscosity of the electrolyte fluid which can be caused by material being removed from the workpiece. The orbital resonant system adjusts for such changes in viscosity by recognizing the changes of resistive impedance. The oscillator thus automatically adjusts the phase angle of its vibratory output to correspondingly adjust for changes in the material loading caused by material removal as the material is picked up by the working fluid, i.e. in the gap 47 between the tool tip and the workpiece.

Further, as the metal is removed from the surface of the workpiece, the gap 47 is obviously widened. It is generally critical in electrical machining processes that the gap 47 be maintained at a constant predetermined width. Thus, as the material of the workpiece is machined away, the tool must be continuously moved downward to maintain the necessary spacing in the gap 47. The utilization of the orbital resonant system of the invention uniquely provides a simple and convenient method for moving the tool 29, effectively depending upon the metal removal rate from the workpiece 17. As shown in the diagram in FIG. 4, a power factor sensor 92 can be located between the motor and the power supply 93 which drives the orbiting-mass oscillator 25. As the gap 47 increases in width the resistive impedance due to the increased amount of fluid present between the tool and the workpiece is sensed by the system. This is reflected as a change of the load on the system. This change in load causes a corresponding change in the power factor of the power to the motor which can be sensed by tapping off the line between the power supply and the motor utilizing a conventional power factor sensor. Such a power factor sensor can be, for example, a Weston Model 839 Single Phase Power Factor Transducer.

The output from the power factor sensor 92 can be calibrated to reflect the change in distance between the tool and workpiece. The calibrated output can be amplified by a D-C amplifier and fed as shown in FIG. 4 to a servomechanism 94 which can be mechanically linked to the tool 29 through the elastic column 27 to accordingly move it downwardly as the workpiece is machined. The utilization of a universal joint as shown in FIG. 1 between the motor 21 and oscillator 25 enables movement of the oscillator, column 27 and tool 29 relative to the stationary motor to enable sufficient machining depth of the workpiece. Obviously other arrangements can be devised so as to allow even greater displacement of the tool into the workpiece through the servomechanism 94. It should be established that the particular circuit shown in FIG. 4 for moving the tool relative to the workpiece takes advantage of the particular utilization of the orbital resonant system and its sensitivity to resistive impedance. However, a conventional servomechanism for moving the tool independent of the load can be successfully utilized. In such an instance the servomechanism is programmed separately from the operation of the resonator in a manner conventional in the art of electromachining.

I claim:

1. In an apparatus for electrical machining a workpiece comprising:
   an electrically conductive tool,
   an electrical power source,
   means for connecting said tool to the negative potential of said electrical source to make said tool cathodic,
   means for connecting said workpiece to the positive potential of said electrical source to make said workpiece anodic,
   means for flowing a working fluid between said workpiece and tool,
   means for resonantly vibrating said tool with the fluid and the workpiece acoustically coupled to the tool as a resonant vibration system comprising an elastic elongated column connected at one end thereof to the tool and an orbiting mass oscillator connected to the opposite end of said column, whereby a standing wave pattern is established in said column and tool,
   means for sensing changes of load on said resonant vibration system resulting from deviation from a desired gap between the workpiece and tool, and means for moving said tool relative to the workpiece in accordance with said load sensing to restore the gap.

2. A device for electrical machining a workpiece comprising:
an electrically conductive tool,
an electrical power source,
means for connecting said tool to the negative potential of said electrical source to make the tool cathodic,
means for connecting the workpiece to the positive potential of said electrical source to make the workpiece anodic,
an elastic column connected at one end thereof to the tool,
an orbiting mass oscillator connected to the opposite end of the column for resonantly vibrating the column, tool fluid and workpiece as a resonant vibration system,
means for driving said oscillator,
means for sensing changes in the power factor of said means for driving said oscillator as the resistive impedance of the system changes, and
servomechanism means responsive to said sensing means for moving said tool to maintain the gap between the tool and the workpiece substantially constant.

3. The device of claim 2 and additionally including means for centering the tool relative to the workpiece.

4. The device of claim 3 wherein said centering means comprises a ring surrounding said column and a rigid support structure to which said ring is affixed.

5. The device of claim 4 and further including means for acoustically isolating the support structure from the column.

6. The device of claim 4 wherein said means for connecting said tool to the negative potential of the electrical source comprises the ring and the column.

7. The device of claim 2 wherein said elastic column is a hollow cylinder.

References Cited

UNITED STATES PATENTS

| 3,280,016 | 10/1966 | Bass et al. | 204—222 X |
|---|---|---|---|
| 3,287,245 | 11/1966 | Williams | 204—255 X |
| 3,442,785 | 5/1969 | Easton | 204—224 |

FOREIGN PATENTS

| 276,823 | 4/1964 | Australia | 204—143 M |
|---|---|---|---|
| 789,293 | 1/1958 | Great Britain | 204—143 |

JOHN H. MACK, Primary Examiner

D. R. VALENTINE, Assistant Examiner

U.S. Cl. X.R.

204—224, 225; 219—69 V